(12) United States Patent
Chiavarotti et al.

(10) Patent No.: US 6,428,842 B1
(45) Date of Patent: Aug. 6, 2002

(54) PROCESS FOR PRODUCING AN IMPERMEABLE OR SUBSTANTIALLY IMPERMEABLE ELECTRODE

(75) Inventors: Giovanni Pietro Chiavarotti, Milan (IT); Jean Constanti, Poissy (FR); Giuseppe Vono, Milan (IT)

(73) Assignee: Becromal S.p.A., Milan (IT)

( * ) Notice: Subject to any disclaimer, the term of this patent is extended or adjusted under 35 U.S.C. 154(b) by 0 days.

(21) Appl. No.: 09/357,300

(22) Filed: Jul. 20, 1999

(30) Foreign Application Priority Data

Jul. 20, 1998 (DE) .......................... 198 32 355

(51) Int. Cl.⁷ .............................. B05D 5/12; H01M 6/00
(52) U.S. Cl. ................... 427/80; 427/122; 427/379; 427/437; 427/443.1; 29/623.5; 29/885
(58) Field of Search ........................ 427/79, 80, 122, 427/379, 437, 443.1; 361/508, 516, 532; 429/231.8; 204/290.15, 294; 29/623.5, 885

(56) References Cited

U.S. PATENT DOCUMENTS 5,158,843 A * 10/1992 Batson et al. ............... 429/218
5,723,232 A * 3/1998 Yamada et al. ............. 429/245

FOREIGN PATENT DOCUMENTS

EP 0470563 2/1992
RU 2080678 * 5/1997

OTHER PUBLICATIONS

Database WPI, Section Ch, Week 199806, Derwent Publications Ltd., London, GB; Class L03, AN 1998–061786, XP002119143 & RU 2 080 678 C (Voron Radio Parts Wks Stock Co), May 27, 1997.

* cited by examiner

*Primary Examiner*—Brian K. Talbot
(74) *Attorney, Agent, or Firm*—Wenderoth, Lind & Ponack, L.L.P.

(57) ABSTRACT

A process for producing an impermeable electrode for electrolytic capacitors, supercapacitors or batteries, with an impermeable conductive layer of graphite, which is deposited from a suspension comprising graphite at a concentration between 1 and 50 g/l in an organic solvent on a substrate by immersion for a given length of time of, for example, approximately 10 to 60 seconds and wherein, after the deposition, the substrate with the layer of graphite is dried at a temperature between approximately 80 and 150° C. for a given length of time of, for example, approximately 1 minute and, after the drying, is heat-treated at a temperature between approximately 200 and 450° C. for a given length of time of, for example, approximately 5 to 60 minutes.

25 Claims, No Drawings

PROCESS FOR PRODUCING AN IMPERMEABLE OR SUBSTANTIALLY IMPERMEABLE ELECTRODE

BACKGROUND OF THE INVENTION

The present invention relates to a process for producing an impermeable or substantially impermeable electrode, for example, electrolytic capacitors, supercapacitors or batteries.

It is known in the field of electrolytic capacitors to use metal foils as cathodes. Therein the metal foils are etched chemically or electrochemically. The etching penetrates into the material body of the metal foil whereby the surface and, thus, the specific capacitance, of the. foil is increased. Due to the etching, the electric resistance, for example of an aluminum foil, in comparison to a non-etched foil, is increased by a factor which is a function of the quantity of the metal removed during the. etching process. In addition, the metal foil loses mechanical strength. The natural oxidation which takes place with this treatment yields a capacitance which is a function of the dielectric constant of the metal itself and the treatment performed on the metal foil.

SUMMARY OF THE INVENTION

In contrast, according to the present invention the desired capacitance is attained through the deposition of graphite. In this way neither the electric resistance nor the mechanical strength of the metal foil are impaired.

DETAILED DESCRIPTION OF THE INVENTION

More specifically, the present invention provides a process for producing an impermeable or substantially impermeable electrode suitable for use in an electrolytic capacitor or battery, which comprises immersing a substrate in a suspension comprising graphite in an organic solvent in a concentration of graphite of 1 to 50 g/l to deposit a layer of graphite on the substrate, removing the substrate with graphite layer thereon from the suspension, drying the substrate with graphite layer thereon at approximately 80 to 150° C., and heat-treating the dried substrate with graphite layer thereon at 200 to 450° C. to form an impermeable or substantially impermeable conductive layer of graphite on the substrate.

The invention provides in particular a simple and effective process for producing an electrode for electrolytic capacitors, supercapacitors or batteries with an impermeable conducting layer of graphite, which is deposited from a suspension comprising graphite at a concentration between 1 and 50 g/l in an organic solvent onto a substrate by immersion for a given length of time of, for example, approximately 10 to 60 seconds, wherein, after the deposition, the substrate with the layer comprising graphite is dried at a temperature between 80 and 150° C. for a given length of time of, for example, approximately 1 minute and, after the drying, is heat-treated at a temperature between approximately 200 and 450° C. for a given length of time, for example, approximately 5 to 60 minutes.

The organic solvent which serves as a vehicle for the graphite during the layer formation is eliminated during the drying. In the final heat treatment at increased temperatures a compact impermeable deposition layer of graphite is obtained, which covers the substrate and adheres to it. The selection of the temperature and length of the heat treatment determines the quality of the compactness and of the adhesive strength of the layer.

If the capacitance of such an electrode is measured in a solution of ammonium adipate with a resistance of 15 Ω.cm and a pH value of 6.6, considerable capacitance values between 100 $\mu$F and 5000 $\mu$F are obtained.

If, for example, an etched cathode foil having a thickness of 50 $\mu$m (length of the substrate: 100 cm; width of the substrate: 4 cm), such as is conventionally used in capacitor technology, is compared in the usual manner with a corresponding foil of 30 $\mu$m thickness, on which a layer of graphite has been deposited according to the invention, the results in Table 1 are obtained:

TABLE 1

| Foil thickness | Technology | Electric resistance | Capacitance $\mu$F/cm$^2$ | Mechanical strength |
|---|---|---|---|---|
| 30 $\mu$m | produced according to the invention | 30 mΩ | 1000 | 35 N/cm |
| 50 $\mu$m | conventionally etched | 33 mΩ | 440 | 30 N/cm |

It is evident that with the process according to the invention significantly higher capacitance values with considerably lesser foil thickness can be attained, and specifically at lower electric resistance and higher mechanical strength. Electrodes according to the invention are therefore far superior to conventional etched foils. Due to the lower material strength of the electrodes according to the invention it is possible, for example when they are used as a cathode in an electrolytic capacitor, to achieve significantly higher capacitance values at identical volume.

The following Table 2 shows the characteristic capacitance behavior with respect to the frequency of an electrode (approximately 20 cm$^2$) according to the invention in comparison to a cathode etched in the conventional manner.

TABLE 2

| Frequency (Hz) | Electrode produced according to the invention $\mu$F | Conventionally etched cathode $\mu$F |
|---|---|---|
| 10 | 80000 | 4400 |
| 20 | 40000 | 4000 |
| 50 | 18000 | 3600 |
| 100 | 9600 | 3400 |
| 1000 | 1100 | 2500 |
| 10000 | 50 | 1010 |

It is evident that electrodes according to the invention assume considerably higher capacitance values at low frequencies below approximately 300 Hz. Capacitors equipped with electrodes according to the invention are therefore preferably suitable for energy storage.

The substrate for the electrode according to the invention on which the graphite is deposited, is preferably a metal foil, for example comprising aluminum, or an insulating foil comprising a synthetic material. When using a metal foil, the layer of graphite behaves like a short circuit prevents any change in the ohmic resistance of the substrate. If the substrate is insulating, the graphite layer represents a minimum electric resistance. The metal foil can remain untreated before the deposition of the graphite, however, it is preferably chemically or eletrochemically pickled and/or treated with mechanical surface treatment, such as brushing, in order to further improve the efficiency of the electrode produced according to the invention.

The layer of graphite can be deposited on one side or on both sides of the substrate.

The organic solvent for the graphite suspension is, for example, an alcohol, a mixture of alcohols or a solvent having a carbonyl group.

The heating of the layer of graphite should preferably take place in a controlled atmosphere or in an inert gas atmosphere such as a nitrogen or argon atmosphere.

The substrate for the deposition of the graphite preferably has a thickness between approximately 15 and 55 µm.

The invention is also directed to the use of. an electrode produced according to the previously described process. The use takes place, as already mentioned, preferably as a cathode of an electrolytic capacitor for very low frequencies, which has an anode supporting an oxide layer with dielectric properties, for example as an electrode of a supercapacitor operating according to the principle of the Helmotz double layer and a diffusion layer.

The electrode produced according to the invention can also be used as the negative electrode of a battery.

When using the electrode in a graphite battery with a graphite block and a negative case, a metal foil serves as the substrate, both sides of the substrate are covered with a layer of graphite, and a contact between the graphite block and the negative case is established.

When using an electrode according to the invention as the electrode of a lithium battery, the substrate is a metal foil which is placed between the separators and is connected with the negative battery case.

What is claimed is:

1. A process for producing an impermeable or substantially impermeable electrode suitable for use in an electrolytic capacitor or battery, which comprises immersing a substrate in a suspension consisting of graphite in an organic solvent in a concentration of graphite of 1 to 50 g/l to deposit a layer of graphite on the substrate, removing the substrate with graphite layer thereon from the suspension, drying the substrate with graphite layer thereon at approximately 80 to 150° C., and heat-treating the dried substrate with graphite layer thereon at 200 to 450° C. to form an impermeable or substantially impermeable conductive layer of graphite on the substrate.

2. The process according to claim 1, wherein the substrate is immersed in the suspension for approximately 10 to 60 seconds.

3. The process according to claim 1, wherein the drying is for approximately 1 minute.

4. The process according to claim 1, wherein the heat-treating is for approximately 5 to 60 minutes.

5. The process according to claim 1, wherein the substrate is a metal foil, or an insulating foil comprising a synthetic material.

6. The process according to claim 5, wherein the metal foil is an aluminum foil.

7. The process according to claim 5, wherein the metal foil, before immersion in the suspension, is untreated, chemically treated, electrochemically pickled, or subjected to mechanical surface treatment.

8. The process according to claim 7, wherein the mechanical surface treatment is brushing.

9. The process according to claim 1, wherein a layer of the graphite is deposited on both sides of the substrate.

10. The process according to claim 1, wherein the organic solvent is an alcohol, a mixture of alcohols, or a carbonyl group-containing organic solvent.

11. The process according to claim 1, wherein the heat-treating is conducted in an inert gas atmosphere.

12. The process according to claim 11, wherein the inert gas atmosphere is a nitrogen or argon atmosphere.

13. The process according to claim 1, wherein the substrate has a thickness of approximately 15 to 55 µm.

14. Process of manufacturing an impermeable electrode for electrolytic capacitors, supercapacitors and batteries which comprises:

providing an impermeable conductive graphite layer on a substrate, which graphite layer is deposited from a suspension consisting of graphite having a concentration of the graphite in a solvent between 1 and 50 g/l, by immersing the substrate into the suspension;

the deposition of the graphite layer being followed by drying the substrate with the deposited layer at a temperature between 80 and 150° C.;

and followed by thermal treatment of the substrate at a temperature between 200 and 450° C.

15. Process according to claim 14, wherein a metal foil or an isolating foil is used as a substrate.

16. Process according to claim 15, wherein the metal foil before the deposition of the graphite layer is kept raw or surfaced pickled, carried out chemically or electrochemically, and/or mechanically surfaced treated.

17. Process according to claim 14, wherein the graphite layer is deposited on one side or on both sides of the substrate.

18. Process according to claim 14, wherein alcohol, a mixture of alcohols or a solvent comprising substances with carbonylic groups is/are used as organic solvent for the graphite.

19. Process according to claim 14, wherein the thermal treatment of the graphite layer is performed in a controlled atmosphere or an inert gas atmosphere, as nitrogen or argon.

20. Process according to claim 14, wherein a substrate is used having a thickness of about 15 to 55 µm.

21. The process of claim 14, wherein the substrate is immersed in the suspension for about 10 to 60 seconds.

22. The process of claim 14, wherein the substrate is dried for about 1 minute.

23. The process of claim 14, wherein the substrate is thermally treated for about 5 to 60 minutes.

24. The process of claim 15, wherein the metal foil is aluminum foil.

25. The process of claim 16, wherein the metal foil is brushed before deposition.

* * * * *